US006930243B1

(12) United States Patent
King, Jr. et al.

(10) Patent No.: US 6,930,243 B1
(45) Date of Patent: Aug. 16, 2005

(54) GROUND WIRE INSULATOR POST FOR UTILITY POLES

(76) Inventors: Halm C. King, Jr., P.O. Box 408, Brackettville, TX (US) 78832; Nancy B. King, P.O. Box 408, Brackettville, TX (US) 78832

( * ) Notice: Subject to any disclaimer, the term of this patent is extended or adjusted under 35 U.S.C. 154(b) by 0 days.

(21) Appl. No.: 10/778,741

(22) Filed: Feb. 13, 2004

(51) Int. Cl.[7] ............................................. H02G 7/20
(52) U.S. Cl. .................. 174/45 R; 174/40 R; 52/726.4
(58) Field of Search ........................ 174/40 R, 40 CC, 174/45 R, 100, 101, 135, 136; 52/726.4

(56) References Cited

U.S. PATENT DOCUMENTS

| | | | | |
|---|---|---|---|---|
| 2,230,734 A | * | 2/1941 | Antwerp | 174/45 R |
| 3,162,720 A | * | 12/1964 | Phillips | 174/45 R |
| 3,185,757 A | * | 5/1965 | Phillips | 174/38 |
| 3,220,679 A | * | 11/1965 | Larson | 174/45 R |
| 3,454,706 A | * | 7/1969 | Willox | 174/45 R |
| 3,580,982 A | * | 5/1971 | Havewala | 174/45 R |
| 3,740,455 A | * | 6/1973 | Willox | 174/101 |
| 3,868,080 A | * | 2/1975 | Olson | 174/45 R |
| 4,127,739 A | * | 11/1978 | Farmer | 174/45 R |
| 4,142,178 A | * | 2/1979 | Whyte et al. | 340/310.06 |
| 4,373,111 A | * | 2/1983 | Myers et al. | 174/48 |
| 4,682,747 A | | 7/1987 | King, Jr. et al. | |
| D299,022 S | | 12/1988 | King, Jr. et al. | |
| 4,812,958 A | * | 3/1989 | Rolfe et al. | 174/45 R |
| 4,902,852 A | * | 2/1990 | Wuertz | 174/48 |
| D420,893 S | | 2/2000 | King et al. | |
| 6,027,082 A | | 2/2000 | King et al. | |

* cited by examiner

*Primary Examiner*—Dean A. Reichard
*Assistant Examiner*—Adolfo Nino
(74) *Attorney, Agent, or Firm*—Baker Botts L.L.P.

(57) ABSTRACT

According to one embodiment of the invention, a ground wire insulation system for a utility pole includes a utility pole having at least one power line and a neutral line associated therewith, an elongated conduit formed from an insulative material coupled to the utility pole, and a ground wire disposed within the elongated conduit and coupled at an upper end to the neutral line and at a lower end to ground.

20 Claims, 2 Drawing Sheets

GROUND WIRE INSULATOR POST FOR UTILITY POLES

TECHNICAL FIELD OF THE INVENTION

The present invention relates generally to utility poles and, more particularly, to a ground wire insulator post for utility poles.

BACKGROUND OF THE INVENTION

One of the most common arrangements for supporting power transmission lines includes a plurality of electrical insulators mounted on wooden cross-arms attached to vertical wooden poles so as to provide isolation between the lines and the environment. Such wooden support structures have a number of shortcomings, such as lack of durability, difficulty of construction, and dangerous conditions for workers and animals. The wooden poles and cross-arms are subject to deterioration from exposure to the environment and from internal defects in the materials.

U.S. Pat. Nos. 4,682,747 and 6,027,082 each teach the use of a modular power transmission support structures formed of, in some embodiments, a polyester resin material that addressed at least some of the shortcomings of prior wooden support structures. However, the ground wires associated with utility poles still pose problems. Currently, ground wires are merely stapled to the wooden pole or held off with a V-shaped standoff brackets. In either case, they are exposed to the environment and may be easily contacted by humans or animals, which may cause severe injury or death resulting from electrocution.

SUMMARY OF THE INVENTION

According to one embodiment of the invention, a ground wire insulation system for a utility pole includes a utility pole having at least one power line and a neutral line associated therewith, an elongated conduit formed from an insulative material coupled to the utility pole, and a ground wire disposed within the elongated conduit and coupled at an upper end to the neutral line and at a lower end to ground.

Some embodiments of the invention provide numerous technical advantages. Some embodiments may benefit from some, none, or all of these advantages. For example, according to certain embodiments, a ground wire insulator post for utility poles may be mounted quickly and easily by a single installer working alone. The insulator post, which in some embodiments may be adjustable, is extremely resistant to deterioration resulting from exposure to the environment and from damage caused by vandals or wild animals. The insulator post protects at least the portion of the ground wire near the top of the utility pole from the environment, which eliminates the possibility of workers or animals, such as birds, from coming in contact with the ground wire that could cause severe injury or death. In addition, the material that the insulator post is formed from is a deterrent to attraction of lightning strikes, which adds an additional safety feature.

Other technical advantages are readily apparent to one skilled in the art.

DETAILED DESCRIPTION

Figure 1:
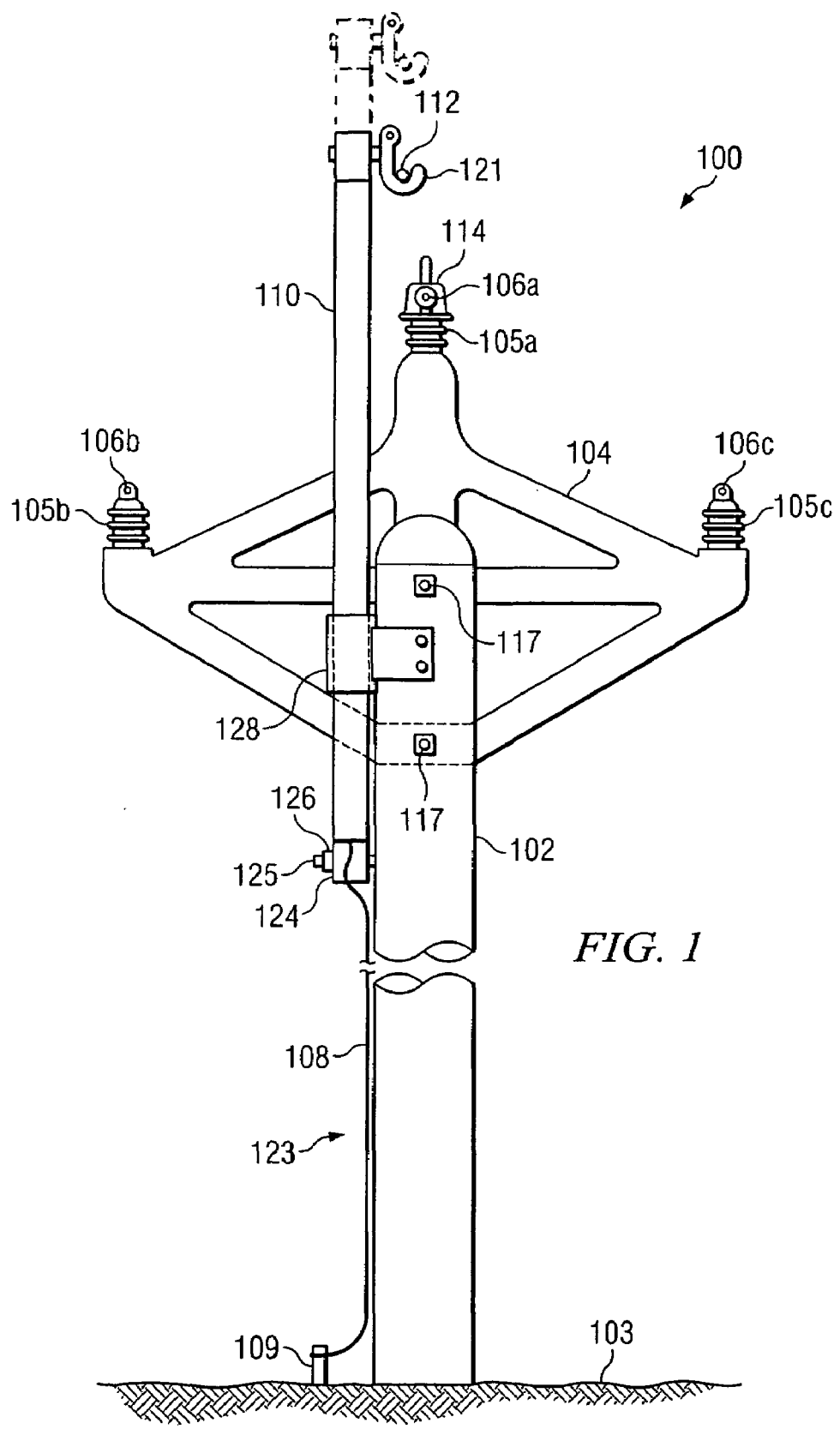
FIG. 1 is a front elevation view of a ground wire insulation system for a utility pole in accordance with one embodiment of the present invention.
Figure 2:
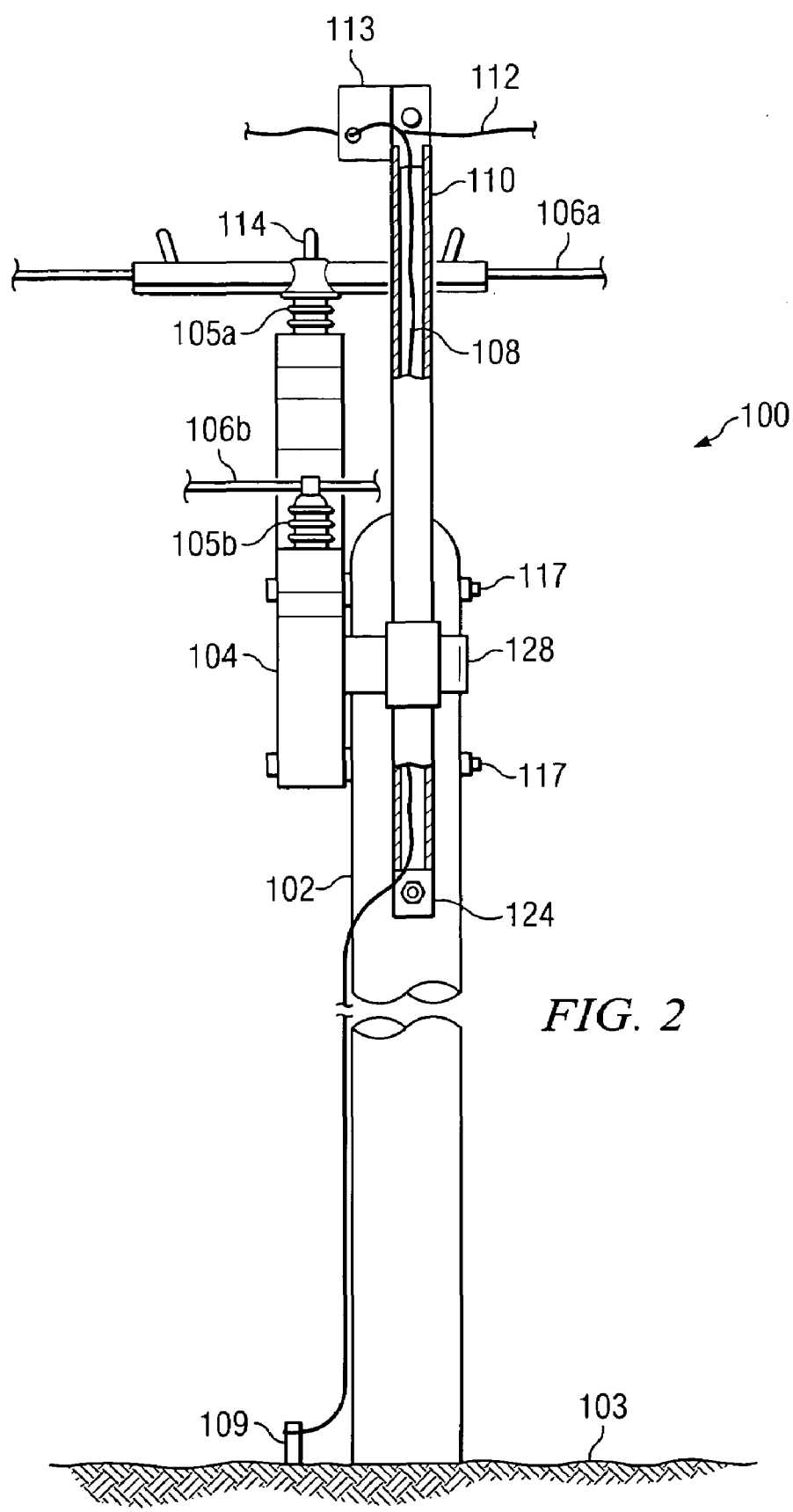
FIG. 2 is a partial side elevation view of the ground wire insulation system of FIG. 1.

FIG. 1 is a front elevation view and FIG. 2 is a partial side elevation view of a ground wire insulation system 100 for a utility pole 102 in accordance with one embodiment of the present invention. In the illustrated embodiment, utility pole 102 is a wooden support post extending upwardly from a ground surface 103; however, utility pole 102 may be any suitable structure formed from any suitable material that functions to support one or more power transmission lines 106. In the illustrated embodiment, system 100 includes a cross arm 104 coupled to utility pole 102 for supporting power lines 106a, 106b, 106c, a ground wire 108 coupled at an upper end to a neutral line 112 and at a lower end to a ground post 109 embedded in ground surface 103.

Cross arm 104 may be any suitable structure having any suitable configuration that functions to support power lines 106. In the illustrated embodiment, cross arm 104 is formed from an insulative material and takes the form of the utility cross arm disclosed in U.S. Pat. No. 6,027,082, which is herein incorporated by reference. Cross arm 104 may couple to utility pole 102 in any suitable manner and in any suitable location. In the illustrated embodiment, cross arm 104 couples to an upper portion of utility pole 102 with a pair of suitable fasteners 117. Cross arm 104 may support power lines 106 in any suitable manner. In the illustrated embodiment, cross arm 104 includes an upper insulator member 105a for supporting power line 106a, and a pair of opposed insulator members 105b, 105c for supporting power lines 106b, 106c, respectively.

Also illustrated in FIGS. 1 and 2 is a raptor cap 114 coupled to upper insulator member 105a of cross arm 104 and surrounding a portion of power line 106a. Raptor cap 114, which may extend any suitable distance along power line 106a, is formed from any suitable material for protecting birds, humans, and other animals from the power running through power line 106a.

Ground wire 108 may be any suitable conductor formed from any suitable material that functions to couple neutral line 112 to ground post 109 embedded in ground surface 103. In the illustrated embodiment, ground wire 108 is a wire formed from copper and having an American Wire Gauge (AWG) size of No. 6. However, the present invention contemplates any suitable size and any suitable material for ground wire 108.

Ground wire 108 may couple to neutral line 112 in any suitable manner; however, in one embodiment a crimp connector 113 is utilized. Neutral line 112 may be supported by a suitable support structure 121 that couples to an upper portion of elongated conduit 110 in any suitable manner. Ground wire 108 may also couple to ground post 109 in any suitable manner. In addition, ground wire 108 couples to a lower portion 123 of utility pole 102 in any suitable manner. For example, in one embodiment, ground wire 108 couples to lower portion 123 with a plurality of staples or other suitable fasteners. The remainder of ground wire 108 is disposed within elongated conduit 110, as described in further detail below.

Elongated conduit 110 may be any suitable conduit formed from any suitable insulative material. Insulative material, as used herein, means any material unable to conduct an amount of electricity that would prevent a human, a bird, or other animal from contacting the insulative material for any appreciable period of time. In one embodiment, the insulative material is a composite material formed from any suitable matrix and any suitable fiber. For example, the composite material may be fiberglass. In a particular embodiment, insulative material includes an outer shell of polyester resin material with a plurality of alternating layers of synthetic fabric and polyester resin material disposed therein. In other embodiments, a form core (not illustrated) is disposed within elongated conduit 110.

Elongated conduit 110 may have any suitable length and any suitable inside and outside diameter. As one example, a length of elongated conduit 110 may be approximately ten feet and an outside diameter of elongated conduit 110 may be approximately two to three inches. In some embodiments, elongated conduit 110 may be non-circular in cross section.

In the illustrated embodiment, elongated conduit 110 is parallel with utility pole 102 and couples to utility pole 102 with a bracket 124 that secures elongated conduit 110 to utility pole 102 with a suitable bolt 125 and nut 126. However, the present invention contemplates any suitable positioning for elongated conduit 110 and any suitable attachment method. Although bracket 124 is illustrated as being disposed within the lower open end of elongated conduit 110, bracket 124 may couple to the lower end of elongated conduit 110 in any suitable manner.

To generally prevent lateral movement of elongated conduit 110, a guide member 128 may be utilized. Guide member 128 may couple to utility pole 102 in any suitable manner. Guide member 128 may make installation of elongated conduit 110 easier for personnel by controlling lateral movement of elongated conduit 110 to allow easier height adjustment of the elongated conduit 110 so that personnel may obtain the desired positioning of elongated conduit 110 before coupling to utility pole 102.

In one embodiment of the invention, elongated conduit 110 is positioned with respect to utility pole 102 such that the lower end of elongated conduit 110 extends at least three feet below a connection point of the lowest power line associated with cross arm 104 and an upper end of elongated conduit 110 extends above a connection point of the highest power line (associated with cross arm 104. With respect to the illustrated embodiment, power lines 106*b* and 106*c* are the lowest-most power lines and power line 106*a* is the highest-most power line. This facilitates a "safety zone" for personnel working on utility pole 102. This is especially important when utility poles are worked on in a "hot" condition. The insulative material utilized for elongated conduit 110 prevents workers, birds, or other animals from directly contacting ground wire 108, which could cause severe injury or even death. Utilizing elongated conduit 110 formed from an insulative material along with cross arm 104 formed from an insulative material, such as disclosed in U.S. Pat. No. 6,027,082 makes the working zone near the top of utility pole 102 substantially free of metal and dangerous conductive surfaces. In addition, this insulative material is a deterrent to the attraction of lightning strikes.

Thus, elongated conduit 110 serves as an insulating member that protects at least a portion of ground wire 108 near the top portion of utility pole 102 from the environment, which substantially reduces or eliminates the possibility of humans, birds, or other animals from coming in contact with ground wire 108 that could cause severe injury or death. Because of the relatively small size and weight of elongated conduit 110, elongated conduit 110 may be quickly and easily mounted to a utility pole by a single installer working alone. Because of the height adjustable feature of elongated conduit 110, elongated conduit 110 may be easily retrofit to existing utility poles having various cross arm configurations.

Although some embodiments of the present invention are described in detail, various changes and modifications may be suggested to one skilled in the art. The present invention intends to encompass such changes and modifications as falling within the scope of the appended claims.

What is claimed is:

1. A ground wire insulation system for a utility pole, comprising:
   a utility pole having at least one power line and a neutral line existing above the at least one power line;
   an elongated conduit formed from an insulative material coupled to the utility pole, an upper end of the elongated conduit extending above the at least one power line; and
   a ground wire disposed within the elongated conduit and coupled at an upper end to the neutral line and at a lower end to ground.

2. The ground wire insulation system of claim 1, wherein the elongated conduit is parallel with the utility pole.

3. The ground wire insulation system of claim 1, wherein the insulative material comprises a composite material.

4. The ground wire insulation system of claim 3, wherein the composite material comprises fiberglass.

5. The ground wire insulation system of claim 3, wherein the composite material comprises:
   an outer shell of polyester resin material; and
   a plurality of alternating layers of synthetic fabric and polyester resin material.

6. The ground wire insulation system of claim 1, wherein an American Wire Gauge size of the ground wire is No. 6.

7. The ground wire insulation system of claim 1, wherein the elongated conduit is height adjustable.

8. The ground wire insulation system of claim 1, further comprising:
   a guide member for preventing lateral movement of the elongated conduit; and
   a bracket for securing the elongated conduit to the utility pole.

9. The ground wire insulation system of claim 1, wherein the lower end of the elongated conduit extends at least three feet below a connection point of the lowest power line associated with the utility pole.

10. The ground wire insulation system of claim 1, further comprising a crimp connector coupling the ground wire to the neutral line.

11. A method for insulating a ground wire associated with a utility pole, comprising:
    coupling an elongated conduit formed from an insulative material to a utility pole having power lines and a neutral line existing above the power lines such that an upper end of the elongated conduit extends above the power lines;
    disposing a ground wire within the elongated conduit; and
    coupling an upper end of the ground wire to the neutral line and a lower end of the ground wire to ground.

12. The method of claim 11, further comprising causing the elongated conduit to be parallel with the utility pole when coupled thereto.

13. The method of claim 11, wherein the insulative material comprises a composite material.

14. The method of claim 11, further comprising adjusting a vertical position of the elongated conduit.

15. The method of claim 11, further comprising:
preventing lateral movement of the elongated conduit when coupled to the utility pole;
adjusting a vertical position of the elongated conduit; and
securing the elongated conduit to the utility pole.

16. The method of claim 11, further comprising causing a lower end of the elongated conduit to extend at least three feet below a connection point of the lowest power line associated with the utility pole.

17. A ground wire insulation system for a utility pole, comprising:
a utility pole extending upwardly from the ground;
a cross arm coupled to a top portion of the utility pole;
a plurality of power lines coupled to the cross arm;
a neutral line coupled to the cross arm and existing above the power lines;
an elongated conduit formed from an insulative material coupled to the utility pole and extending substantially parallel with the utility pole;
an upper end of the elongated conduit extending above a connection point of the highest power line coupled to the utility pole;
a lower end of the elongated conduit extending below a connection point of the lowest power line coupled to the utility pole; and
a ground wire disposed within the elongated conduit and coupled at an upper end to the neutral line and at a lower end to ground.

18. The ground wire insulation system of claim 17, wherein the insulative material comprises a composite material.

19. The ground wire insulation system of claim 18, wherein the composite material comprises:
an outer shell of polyester resin material; and
a plurality of alternating layers of synthetic fabric and polyester resin material.

20. The ground wire insulation system of claim 17, further comprising:
a guide member for preventing lateral movement of the elongated conduit; and
a bracket for securing the elongated conduit to the utility pole.

* * * * *